United States Patent [19]

Fabianowski et al.

[11] Patent Number: 4,941,077
[45] Date of Patent: Jul. 10, 1990

[54] CONFIGURATION FOR STARTING AN INVERTER

[75] Inventors: Jan Fabianowski, Dortmund; Robert Ibach, Schwerte, both of Fed. Rep. of Germany

[73] Assignee: Asea Brown Boveri Aktiengesellschaft, Mannheim, Fed. Rep. of Germany

[21] Appl. No.: 422,645

[22] Filed: Oct. 17, 1989

[30] Foreign Application Priority Data

Oct. 21, 1988 [DE] Fed. Rep. of Germany ....... 3835869

[51] Int. Cl.$^5$ .............................................. H02M 5/48
[52] U.S. Cl. ........................................ 363/49; 363/37; 363/51; 363/58
[58] Field of Search .................... 363/35, 37, 49, 51, 363/54, 55, 56, 57, 58; 361/56, 57, 91, 93, 100; 323/901

[56] References Cited

U.S. PATENT DOCUMENTS

| | | | |
|---|---|---|---|
| 4,331,994 | 5/1982 | Wirth | 363/37 |
| 4,340,931 | 7/1982 | Endo et al. | 363/37 |
| 4,405,975 | 9/1983 | Overstreet et al. | 363/49 |
| 4,573,113 | 2/1986 | Bauman | 363/49 |
| 4,589,059 | 5/1986 | Tanino | 363/49 |
| 4,719,553 | 1/1988 | Hinckley | 363/49 |

FOREIGN PATENT DOCUMENTS 1032566 7/1983 U.S.S.R. .................. 363/49

Primary Examiner—Peter S. Wong
Attorney, Agent, or Firm—Herbert L. Lerner; Laurence A. Greenberg

[57] ABSTRACT

A configuration for starting an inverter includes a capacitor which is provided for overvoltage protection in a half-controlled 3-phase bridge, with a discharging resistor used for charging an intermediate-circuit capacitor through a switch and a diode, in such a manner that an isolating transformer at the output of an inverter is premagnetized so that the inverter reliably turns on during the starting process.

3 Claims, 1 Drawing Sheet

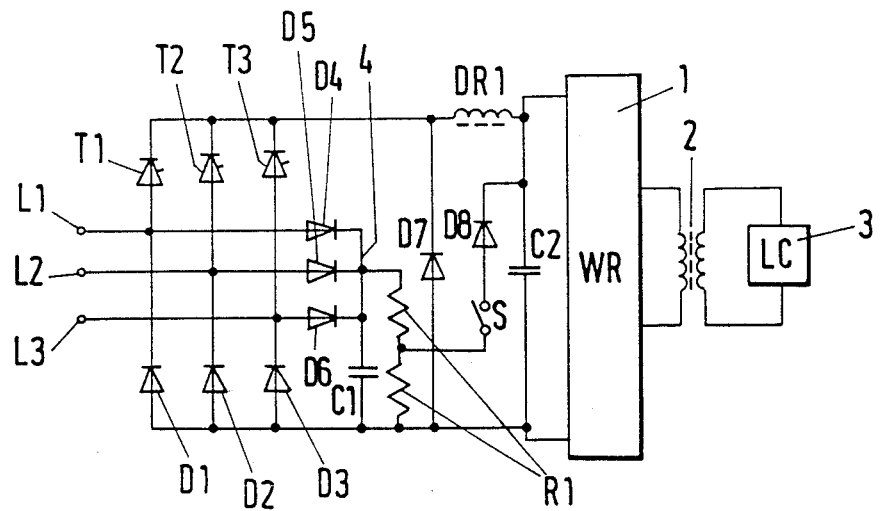

CONFIGURATION FOR STARTING AN INVERTER

The invention relates to a configuration for starting an inverter which is supplied by a half-controlled 3-phase bridge being formed of thyristors and diodes, an overvoltage protector being formed of additional diodes and a capacitor with a discharging resistor and an intermediate circuit being formed of reactor and a capacitor which feeds a load constructed as series-resonant circuit in its load circuit through a transformer.

It is known to supply a series-resistant circuit provided as a load with current from an inverter through an isolating transformer. In such a configuration, the inverter is operated, for example, from a 3-phase power system through a half-controlled bridge. It is known to provide protective circuits against overvoltages within the 3-phase bridge.

It is also known to supplement the half-controlled 3-phase bridge by means of several additional diodes to form a complete rectifier bridge and to connect the common output of the rectifier bridge through a capacitor with a parallel discharging resistor to a common negative potential. The energy of any overvoltage occurring is absorbed by the capacitor in that configuration. The capacitor is charged up to the crest or maximum voltage of the power system or network when the 3-phase power system is connected. When voltage peaks occur from the power system or when commutation overvoltages occur, charging current flows into the capacitor. The energy of the voltage peaks increases the charge of the capacitor. The charge is subsequently removed again through the parallel resistor. Such a circuit protects the rectifier components against overvoltage from the power system and from the commutation.

Starting an inverter with a series-resonant load which is driven through an isolating transformer is not always reliable because the transformer core remains in an indeterminate position of remanence after a preceding switch-off. When the system is switched on again, the undefined position of remanence can lead to a steep current rise which is greater than the rated current of the system. The high switch-on current can be reduced by premagnetizing the transformer core in a particular direction with a small voltage which is externally supplied, but such a process is very expensive.

It is accordingly an object of the invention to provide a configuration for starting an inverter, which overcomes the hereinafore-mentioned disadvantages of the heretofore-known devices of this general type, which is simple and which ensures a reliable starting of an inverter for supplying a load circuit being formed of a series-resonant circuit and transformer. With the foregoing and other objects in view there is provided, in accordance with the invention, a configuration for starting an inverter, comprising an inverter supplied by a half-controlled 3-phase bridge including thyristors and diodes, an overvoltage protector connected to the half-controlled 3-phase bridge including additional diodes and a capacitor with a divided discharging resistor having a division point, an intermediate circuit including a reactor and a capacitor with positive and negative terminals, a load formed of a series-resonant circuit in the load circuit of the inverter, a transformer through which the load is fed by the intermediate circuit, a switch connected to the division point, and a diode operating in the forward direction being connected between the switch and the positive terminal of the capacitor of the intermediate-circuit.

In accordance with another feature of the invention, the inverter has two diagonals, and the switch is closed during a starting process and includes means for conducting a partial voltage through the divided resistor, the closed switch and the diode to the capacitor of the intermediate-circuit after the capacitor of the overvoltage protector is charged and the half-controlled 3-phase bridge is blocked, means for subsequently turning on one of the diagonals of the inverter, premagnetizing the transformer in a given direction and reducing current through one of the diagonals of the inverter to zero after discharging the capacitor of the intermediate-circuit, and means for charging the capacitor of the intermediate-circuit up to a full operating voltage through the turned on half-controlled 3-phase bridge and starting the inverter through the other of the diagonals, before the switch is opened.

In accordance with a concomitant feature of the invention, the divided resistor is a potentiometer.

The advantage of the configuration according to the invention is particularly seen in the fact that a low expenditure is used to provide reliable starting of the inverter, even under unfavorable conditions. The inverter can be reliably triggered by the additional load circuit formed by the divider resistors, the switch, the diode and already-existing inter- mediate-circuit capacitor. No additional externally supplied voltage is used for this purpose, but instead a voltage which is already existing in an overvoltage protector of the 3-phase bridge is used.

Other features which are considered as characteristic for the invention are set forth in the appended claims.

Although the invention is illustrated and described herein as embodied in a configuration for starting an inverter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the figure of the drawing.

The drawing is a schematic and block circuit diagram of a half-controlled 3-phase bridge with overvoltage protection, an intermediate circuit, an inverter in a simplified representation and a load fed through a transformer.

Referring now to the single figure of the drawing in detail, there is seen a half-controlled 3-phase bridge formed of three thyristors T1, T2, T3 and three diodes D1, D2, D3 as well as a freewheeling diode D7 which is connected in parallel therewith between positive and negative potentials. Since three diodes already exist, the missing half of an overvoltage protector can be provided or built up by three further diodes D4, D5, D6. A capacitor C1 is connected to negative potential at a common bus bar 4 at the output of the diodes D4, D5, D6. A resistor R1 is connected in parallel with the capacitor C1 in the usual manner for discharging. When a voltage L1, L2, L3 of a 3-phase power system or network is connected at the input side, the capacitor C1 is charged up to the crest or maximum value of the power system voltage. The time constant of the components R1/C1 is selected to be much greater than the duration of the power system period. Such a circuit is known.

The 3-phase bridge is followed by an intermediate circuit being formed of a reactor DR1 and a capacitor C2. The intermediate circuit acts as a filter and is used for reducing power system reactions and for limiting the charging current.

The intermediate circuit is connected to an inverter 1 which drives a load 3 through an isolating transformer 2. The load 3 may, for example, be formed of coil and capacitor and is constructed as a resonant circuit. These components have only been shown as a block diagram in the drawing.

During starting of the inverter 1, an increased switch-on current which can occur due to remanence in the isolating transformer 2, can destroy non-illustrated thyristors and diodes disposed in the inverter. A remanence position of the isolating transformer 2, which is defined before the start of the inverter, prevents a steeply rising current in the inverter.

The invention is based on the use of the potential of the charged capacitor C1 in conjunction with the parallel discharging resistor R1, as short-circuit protection. According to the invention, a voltage existing across a 3-phase bridge with overvoltage protection is thus picked up and used for charging the pre-existing intermediate-circuit capacitor.

For this purpose, the discharging resistor R1 is divided into two individual resistors or into a potentiometer. The center tap of the divided resistor is connected through a switch S and a diode D8, which is operated in the forward direction, to the intermediate-circuit capacitor C2.

The configuration operates as follows:

During the starting process, the switch S is closed. The intermediate circuit capacitor C2 is charged up to a relatively small voltage through the divided resistor R1 (voltage divider resistor), the closed switch S and the diode D8. Non-illustrated thyristors in the diagonal branch of the inverter are subsequently triggered so that the current can flow from the intermediate-circuit capacitor C2 through the inverter 1 and the transformer 2 to the negative potential. As a result, the core of the transformer 2 is premagnetized in a particular direction.

After the voltage from the capacitor C2 has decayed, the current through the transformer 2 goes to zero. This is detected by a non-illustrated triggering device which turns on the thyristors T1, T2, T3 of the 3-phase bridge. As a result, the intermediate-circuit capacitor C2 is charged up to the full operating voltage and subsequently the other diagonal of the inverter 1 is turned on so that the inverter 1 starts. After the starting process, the switch S is opened.

The inverter 1, which is only represented diagrammatically in the drawing, is formed in a conventional manner of two diagonals which are formed by thyristors with antiparallel free-wheeling diodes so that the current flow is switched once through one diagonal and once in the opposite direction through the other diagonal. However, this operation of an inverter is known and is of subordinate significance herein because it is the object of the present invention to reliably start an inverter.

The foregoing is a description corresponding in substance to German Application P 38 35 869.7, dated Oct. 21, 1988, the International priority of which is being claimed for the instant application, and which is hereby made part of this application. Any material discrepancies between the foregoing specification and the aforementioned corresponding German application ar to be resolved in favor of the latter.

We claim:

1. Configuration for starting an inverter, comprising a half-controlled 3-phase bridge including thyristors and diodes, an overvoltage protector connected to said half-controlled 3-phase bridge including additional diodes and a capacitor with a divided discharging resistor having a division point, an intermediate circuit including a reactor and a capacitor with positive and negative terminals, a load formed of a series-resonant circuit in the load circuit of the inverter, a transformer through which said load is fed by said intermediate circuit, a switch connected to said division point, and a diode operating in the forward direction being connected between said switch and the positive terminal of said capacitor of said intermediate-circuit.

2. Configuration according to claim 1, wherein the inverter has two diagonals, and said switch is closed during a starting process and includes:
means for conducting a partial voltage through said divided resistor, said closed switch and said diode to said capacitor of said intermediate-circuit after said capacitor of said overvoltage protector is charged and said half-controlled 3-phase bridge is blocked,
means for subsequently turning on one of the diagonals of the inverter, premagnetizing said transformer in a given direction and reducing current through one of the diagonals of the inverter to zero after discharging said capacitor of said intermediate-circuit, and
means for charging said capacitor of said intermediate-circuit up to a full operating voltage through said turned on half-controlled 3-phase bridge and starting the inverter through the other of the diagonals, before said switch is opened.

3. Configuration according to claim 1, wherein said divided resistor is a potentiometer.

* * * * *